United States Patent [19]

Krugman

[11] Patent Number: 4,883,192
[45] Date of Patent: Nov. 28, 1989

[54] REUSABLE BEVERAGE CONTAINER CLOSURE

[76] Inventor: Robert Krugman, 3302 Aruba Way, Coconut Creek, Fla. 33066

[21] Appl. No.: 255,347
[22] Filed: Oct. 11, 1988
[51] Int. Cl.⁴ .............................................. A47G 19/22
[52] U.S. Cl. ................................ 220/85 SP; 220/90.2; 220/90.4; 222/566
[58] Field of Search ...................... 220/254, 90.2, 90.4, 220/90.6, 85 SP

[56] References Cited

U.S. PATENT DOCUMENTS

| | | | |
|---|---|---|---|
| 2,075,721 | 3/1937 | Hommel | 220/90.6 |
| 2,581,768 | 1/1952 | O'Casey | 220/90.2 X |
| 2,782,614 | 2/1957 | Currie | 220/90.6 |
| 2,839,229 | 6/1958 | Scheswohl | 220/90.2 X |
| 3,014,621 | 12/1961 | Povitz | 220/90.6 X |
| 3,185,341 | 5/1965 | BArbour | 220/90.6 |
| 3,429,478 | 2/1969 | Ward | 220/90.2 |
| 4,356,926 | 11/1982 | Priestly et al. | 220/85 SP X |
| 4,579,257 | 4/1986 | Brandlein | 220/85 SP X |

*Primary Examiner*—STephen Marcus
*Assistant Examiner*—Nova S. Tucker
*Attorney, Agent, or Firm*—Max Yarmovsky

[57] ABSTRACT

A bifunctional reusable beverage container closure is designed to reseal and/or enable easy drinking from an opened pop-tab type metal can of soda or beer. A hollow funnel-shaped housing uses axially aligned spout and skirt means on oppositely disposed ends. The skir means is designed to snap-lock under a crimp bead of the metal can top while an integral gasket seals against the crimp bead.

2 Claims, 1 Drawing Sheet

REUSABLE BEVERAGE CONTAINER CLOSURE

BACKGROUND OF THE INVENTION

The present invention relates to a bifunctional reusable beverage container closure. It is for resealing or drinking from a conventional pop-tab can of carbonated soda, beer or other pressurized liquid after partial usage.

In the past, one of the problems with the use of cans containing carbonated liquids, which were opened and partially consumed, was the difficulty of preserving the carbonation during relatively short term storage.

Another problem with drinking from the present state of the art carbonated soda or beer can is the difficulty of drinking directly from the bung hole in the top cover without accidently spilling the contents thereof on an inexperienced child, or on any elderly person whose hand control is unsteady.

PRIOR ART STATEMENT

A cursory review has been made of class 220, subclasses 306–310, 315, 352 and 359 and no disclosure has been found which may be considered pertinent to the present invention.

SUMMARY OF THE INVENTION

The present invention provides a bifunctional reusable container closure and drinking spout for pressurized liquids. The invention utilizes a funnel-shaped body having a screw capped pouring spout on one end and an annular skirt on the other end. The skirted end snap fits over an opened standard soda or beer can. The skirted end provides means for locking against a crimp bead of the can and for holding an annular gasket seal firming against the bead. The housing may be made of plastic, metal or rubber.

Accordingly, an object of the present invention is to provide a bifunctional container closure for opened metal cans containing carbonated liquids which are desired to be stored in a pressurized state.

A further object of the present invention is to provide a reusable bifunctional container closure for opened metal pop-tab soda or beer cans which also permits a user to drink therefrom through a reclosable spout and to store any remaining carbonated liquid under pressurized conditions.

For a better understanding of the present invention, together with other and further objects thereof, reference is made to the following descriptions taken in connection with the accompanying drawing.

BRIEF DESCRIPTION OF THE DRAWING

Throughout the following description, like reference numerals are used to denote like parts of the drawing.

DESCRIPTION OF THE PREFERRED EMBODIMENTS

Figure 1:
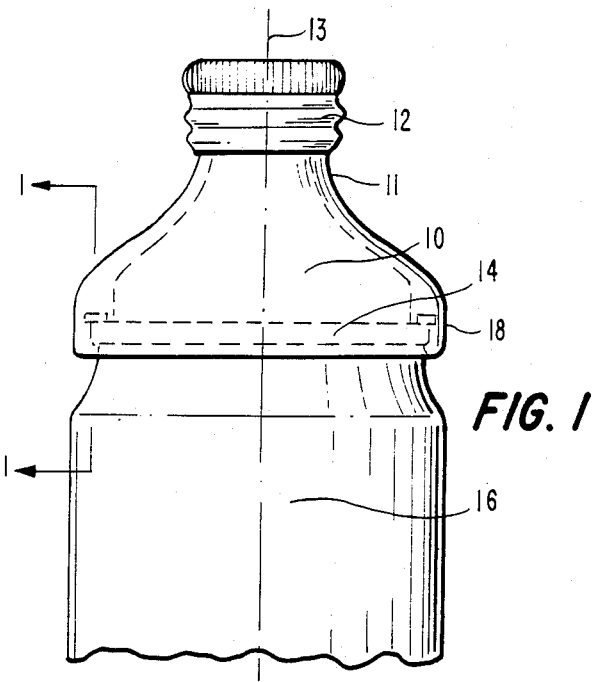
FIG. 1 is a plain view of the subject invention sealed on top of a state of the art standard soda or beer can.

Referring now to FIG. 1, the present invention comprises a hollow funnel-shaped plastic housing 10 having a longitudinal axis 13. A threaded spout end 11 is axially aligned with said longitudinal axis 13. A skirt end 18 is axially aligned with said spout end 11. A removable bottle-type screw cap 12 is threadedly disposed on externally threaded cylindrical spout end 11 and hermetically seals to spout end 11 when tightened thereon. Cap 12 is similar to bottle caps found in the present state of the art. The skirted wall end 18 of housing 10 snap locks around can crimp bead 14 of the metal can 16.

Figure 2:
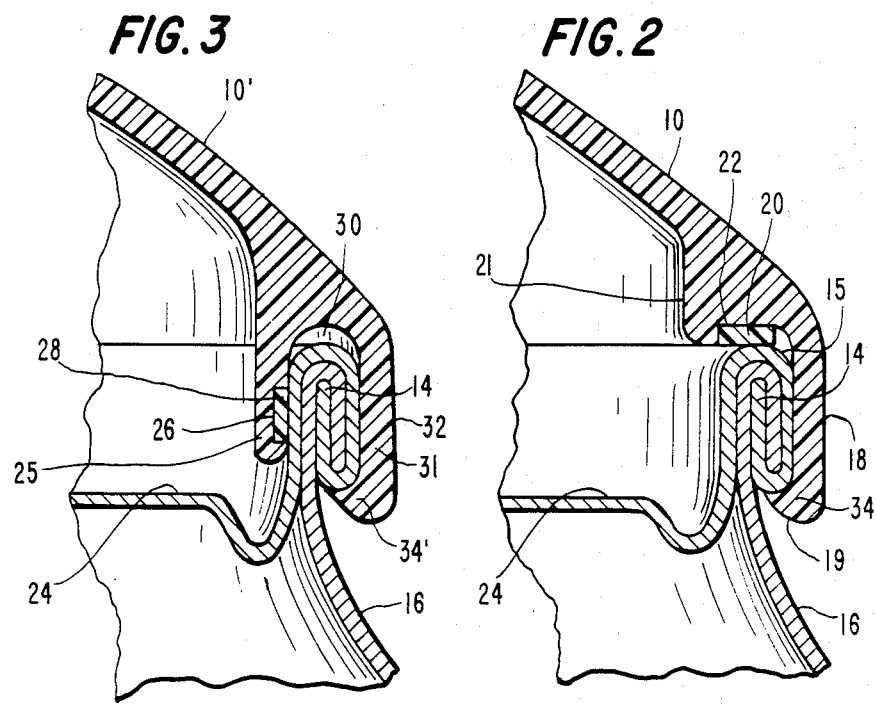
FIG. 2 is a cross-sectional view taken along line 1—1 of FIG. 1.

Referring now to FIG. 2, metal wall 16 and can cover 24 are crimped together to form bead 14. The inner surface of housing skirt wall end 18 is sized to fit snugly against the outer surface of can bead 14. The skirt lower end 34 of the skirt 18 has a hook configuration which locks against the lower end of bead 14. The outer hook 19 is configured to slip over the top bead surface 15 when downward hand pressure is applied to housing 10. The skirt member 18 has at its upper end an annular shelf member 21 which contains an annular gasket groove 22. A gasket member 20 is operatively disposed in groove 22 and compressed against top bead surface 15 to form a hermetic annular seal between housing 10 and can bead 14. When it is desired to remove closure housing 10 from the metal container 16, slight downward pressure is exerted on one side of the housing 10 while upward force is applied on a diametrically opposite side. This will cause the skirt lower hook end 34 to disengage itself from the bead 14 and permit the hollow funnel-shaped plastic housing 10 to be removed therefrom.

Figure 3:
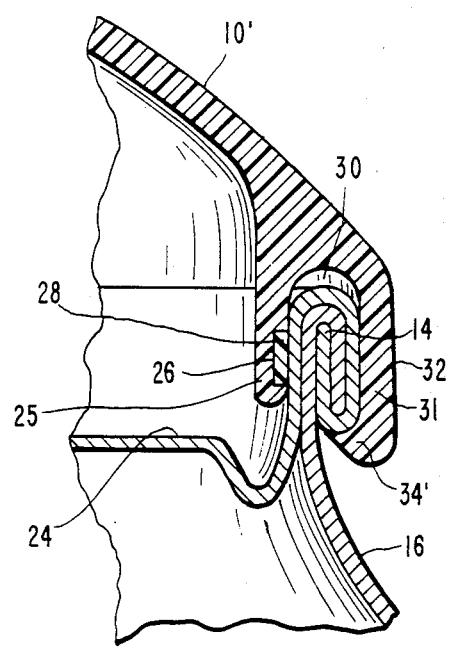
FIG. 3 is a cross-sectional view of an alternate embodiment of the subject invention.

Referring now to FIG. 3, the alternate embodiment has a bifurcated annular skirt 32. The annular central groove 30 is slightly larger in length than the height of can crimp bead 14. The width of groove 30 is designed to snugly fit against the sides of can crimp bead 14. The inner skirt side member 25 has an annular groove 26 therein to operatively hold a gasket 28 in juxtaposition to the inner bead surface of crimp bead 14. The outer skirt side 31 has a lower hook end 34' which locks against the lower end of bead 14. The housing 10' can be removed from can 16 in the same manner as aforedescribed for housing 10 of FIG. 2.

The foregoing disclosure and drawing are merely illustrative of the principles of this invention and are not to be interpreted in a limiting sense. I wish it to be understood that I do not desire to be limited to the exact details of construction shown and described for obvious modifications will occur to a person skilled in the art. The invention should be limited only by the scope of the appended claims.

I claim:

1. A bifunctional reusable beverage container closure for sealing an opened metal can containing carbonated liquids which comprises:
   a hollow funnel-shaped housing having a longitudinal axis, a spout end axially aligned with said axis, and a skirt end axially aligned with said axis;
   spout means axially aligned with said longitudinal axis for recloseably sealing the spout end of said housing, including:
      an externally threaded cylindrical spout end, and
      an internally threaded removable screw cap operatively disposed on said spout end for hermetically sealing said spout end;
   cylindrical skirt means disposed on said skirt end and axially aligned with said axis which includes;
      a cylindrical skirt wall end having a skirt hook lower end which operatively engages a crimp bead of said can;

an annular shelf member having an annular gasket groove therein; and a single annular gasket operatively disposed in said gasket groove for providing hermetic sealing of said housing to said can after it has been opened thereby permitting said carbonated liquids to be stored under pressurized condition.

2. A container closure as recited in claim 1 wherein said skirt means further includes:

a bifurcated annular skirt having an outer skirt side member with a hook lower end operatively disposed against said crimp bead lower end, an inner skirt side member having an annular gasket groove inwardly disposed adjacent to said crimp bead, said outer and inner skirt member having an annular central groove therebetween to allow said crimp bead to snuggly fit against the sides of said can crimp bead when said housing is forced over said crimp bead of said opened metal can; and gasket means operatively disposed in said annular gasket groove forming a hermetic seal between said bifurcated skirt and said crimp bead.

* * * * *